United States Patent
Itami et al.

(10) Patent No.: US 9,087,623 B2
(45) Date of Patent: Jul. 21, 2015

(54) VOLTAGE NONLINEAR RESISTOR CERAMIC COMPOSITION AND ELECTRONIC COMPONENT

(71) Applicant: TDK Corporation, Minato-ku, Tokyo (JP)

(72) Inventors: Takahiro Itami, Tokyo (JP); Naoyoshi Yoshida, Tokyo (JP); Kaname Ueda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/102,005

(22) Filed: Dec. 10, 2013

(65) Prior Publication Data

US 2014/0171289 A1    Jun. 19, 2014

(30) Foreign Application Priority Data

Dec. 13, 2012   (JP) .................................. 2012-272375

(51) Int. Cl.
- *H01C 7/112* (2006.01)
- *C04B 35/453* (2006.01)
- *H01B 3/12* (2006.01)

(52) U.S. Cl.
CPC ............... *H01B 3/12* (2013.01); *C04B 35/453* (2013.01); *H01C 7/112* (2013.01)

(58) Field of Classification Search
CPC ............ H01B 3/10; H01B 3/12; H01C 7/112; C04B 35/453

USPC ................... 338/20, 21; 252/519.51; 501/138
See application file for complete search history.

(56) References Cited

U.S. PATENT DOCUMENTS

| 5,640,136 A | * | 6/1997 | Yodogawa et al. ............. 338/20 |
| 5,854,586 A | * | 12/1998 | McMillan et al. ............. 338/21 |
| 7,754,109 B2 | | 7/2010 | Yoshida et al. |
| 8,488,291 B2 | | 7/2013 | Lien et al. |

FOREIGN PATENT DOCUMENTS

| JP | 53-86498 | * | 7/1978 |
| JP | 61-43403 | * | 3/1986 |
| JP | 2005-093596 A | | 4/2005 |
| JP | 2007-282372 A | | 10/2007 |
| JP | 2008-218665 A | | 9/2008 |
| JP | 2013-194368 A | | 9/2013 |

* cited by examiner

*Primary Examiner* — Karl Group
(74) *Attorney, Agent, or Firm* — Arent Fox LLP

(57) ABSTRACT

A voltage nonlinear resistor ceramic composition comprises zinc oxide, with respect to 100 mol of said zinc oxide, 0.30 to 10 mol of Co oxide in terms of Co, 0.10 to 10 mol of R oxide (note that R is at least one selected from a group consisting of Y, La, Ce, Pr, Nd, Sm, Eu, Gd, Tb, Dy, Ho, Er, Tm, Yb and Lu) in terms of R, 0.10 to 5 mol of Cr oxide in terms of Cr, 0.10 to 5 mol of oxide of at least one selected from Ca and Sr respectively in terms of Ca or Sr, 0.0005 to 5 mol of oxide of at least one selected from Al, Ga and In respectively in terms of Al, Ga or In, and 0.10 to 5 mol of barium titanate in terms of $BaTiO_3$.

2 Claims, 1 Drawing Sheet

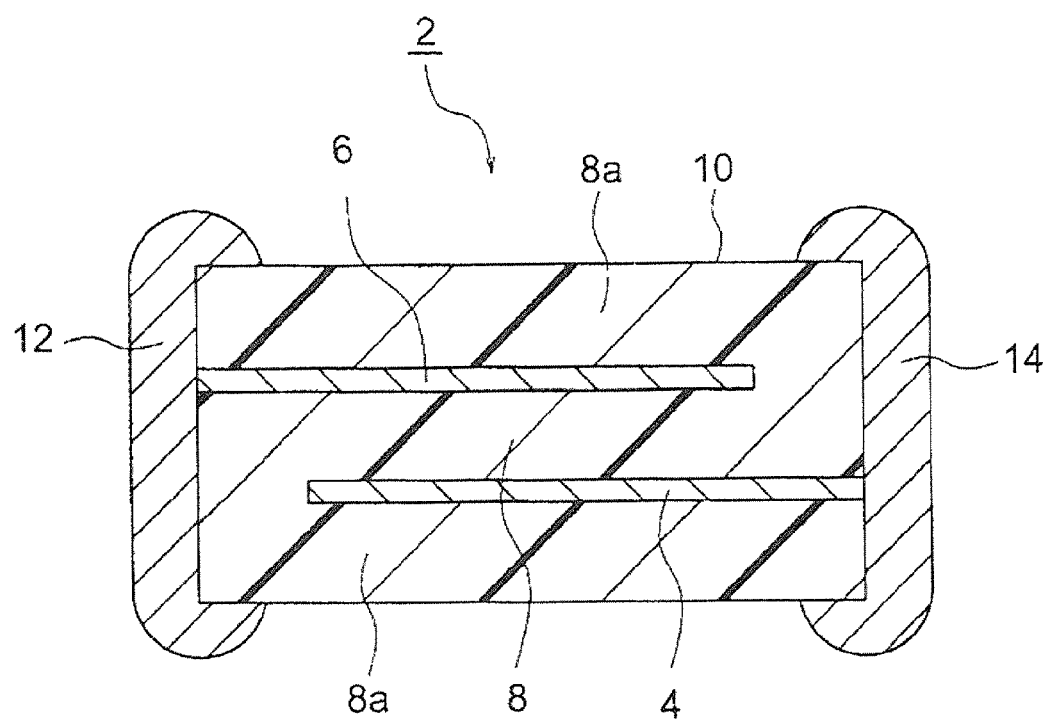

VOLTAGE NONLINEAR RESISTOR CERAMIC COMPOSITION AND ELECTRONIC COMPONENT

CROSS-REFERENCE TO RELATED APPLICATION

This application is based upon and claims the benefit of priority of the Japanese Patent Application No. 2012-272375, filed Dec. 13, 2012, the disclosure of the prior application of which is hereby incorporated in its entirety by reference.

BACKGROUND OF THE INVENTION

1. Field of the Invention

The present invention relates to a voltage nonlinear resistor ceramic composition preferably used for a voltage nonlinear resistor layer of laminated chip varistor for example and also relates to an electronic component in which the voltage nonlinear resistor ceramic composition is used as a voltage nonlinear resistor layer.

2. Description of the Related Art

A varistor as one example of electronic components having a voltage nonlinear resistor layer is used to protect IC circuits of electronic devices and so on by absorbing or removing external surges (abnormal voltage), such as static electricity, and noises.

Recently, the speeds of digital signal and transmission are improved, and also smaller and thinner chip components are requested in order to increase the integration degree of electronic components. In order to achieve the smaller and thinner varistor, the interlayer thickness needs to be thinner.

However, for the conventional voltage nonlinear resistor ceramic composition, when the interlayer thickness is reduced, there has been a problem that it becomes difficult to obtain good varistor characteristics.

Further, as shown in the following Patent Literature 1, barium titanate is sometimes included in the voltage nonlinear resistor ceramic composition including bismuth. However, even if barium titanate is included in the voltage nonlinear resistor ceramic composition including bismuth, there remains a problem that it becomes difficult to obtain good varistor characteristics when the interlayer thickness is reduced.

Patent Literature 1: Japanese Laid-Open Patent Publication No. 2012-60099

SUMMARY OF THE INVENTION

The present invention has been made by considering the above circumstances, and an object of the present invention is to provide a voltage nonlinear resistor ceramic composition and an electronic component capable of achieving good varistor characteristics even if the interlayer thickness is reduced.

In order to achieve the above object, a voltage nonlinear resistor ceramic composition according to the present invention comprises zinc oxide, with respect to 100 mol of said zinc oxide, 0.30 to 10 mol of Co oxide in terms of Co, 0.10 to 10 mol of R oxide (note that R is at least one selected from a group consisting of Y, La, Ce, Pr, Nd, Sm, Eu, Gd, Tb, Dy, Ho, Er, Tm, Yb and Lu) in terms of R, 0.10 to 5 mol of Cr oxide in terms of Cr, 0.10 to 5 mol of oxide of at least one selected from Ca and Sr, respectively in terms of Ca or Sr, 0.0005 to 5 mol of oxide of at least one selected from Al, Ga and In, respectively in terms of Al, Ga or In, and 0.10 to 5 mol of barium titanate in terms of $BaTiO_3$.

In the present invention, by applying the above specific composition and content, particularly by including a certain amount of R oxide and barium titanate, it enables to inhibit a grain growth of crystal grain while having various sorts of good characteristics. Particularly, even when the interlayer thickness is reduced (for example, 10 μm or less), it enables to maintain various sorts of good varistor characteristics.

The electronic component according to the present invention comprises a voltage nonlinear resistor layer composed of the above-mentioned voltage nonlinear resistor ceramic composition.

For the electronic component according to the present invention, it is not particularly limited. However, a laminated chip varistor, a disc varistor, a varistor composite device and the like are exemplified.

BRIEF DESCRIPTION OF THE DRAWINGS

FIGURE is a cross-sectional view of a laminated chip varistor according to one embodiment of the present invention.

DESCRIPTION OF THE PREFERRED EMBODIMENTS

The following is the explanation of the present invention based on embodiments shown in FIGURE.

Laminated Chip Varistor

As shown in FIGURE, a laminated chip varistor 2 as one example of the electronic component comprises an element body 10 having a structure that internal electrode layers 4, 6, an interlayer voltage nonlinear resistor layer 8, and an outer protective layer 8a are laminated. At both ends of this element body 10, a pair of external terminal electrodes 12, 14 electrically connected with the internal electrode layers 4, 6 arranged inside of the element body 10 is formed. Although the shape of the element body 10 is not particularly limited, it is generally a cuboid shape. Further, its size is not particularly limited, and it may be appropriately determined as usage. However, generally, it is approximately width (0.6 to 5.6 mm)×length (0.3 to 5.0 mm)×thickness (0.3 to 1.9 mm).

The internal electrode layers 4, 6 are laminated so that each end thereof exposes on the opposing surfaces of both ends of the element body 10. A pair of external terminal electrodes 12, 14 is formed on both ends of the element body 10, and each electrode is respectively connected to each exposed end of the internal electrode layers 4, 6 to configure a circuit.

For the element body 10, at both outer ends in the lamination direction of the internal electrode layers 4, 6 and the interlayer voltage nonlinear resistor layer 8, the outer protective layers 8a are arranged to protect the inside of the element body 10. Materials for the outer protective layers 8a may be the same with or different from the interlayer voltage nonlinear resistor layer 8.

Internal Electrode Layer

Although conductive materials included in the internal electrode layers 4, 6 are not particularly limited, it is preferable that such materials are composed of Pd or Ag—Pd alloys. The Pd content in the alloy is preferably 95 wt % or more. For the thickness of the internal electrode layers 4, 6, it may be appropriately determined as usage. However, it is generally in the range of 0.5 to 5 μm.

External Terminal Electrode

Although conductive materials included in the external terminal electrodes 12, 14 are not particularly limited, generally, Ag or Ag—Pd alloys are used. For the thickness of the external terminal electrodes 12, 14, it may be appropriately determined as usage. However, it is generally in the range of 10 to 50 μm.

Interlayer Voltage Nonlinear Resistor Layer

For the interlayer voltage nonlinear resistor layer 8, it is composed of voltage nonlinear resistor ceramic composition according to the present embodiment. Such voltage nonlinear resistor ceramic composition includes zinc oxide as a main component, and also includes Co oxide, R oxide, Cr oxide, Ca or Sr oxide, Ga oxide and barium titanate as subcomponents.

For the zinc oxide (ZnO) as a main component, it acts as a substance exerting an excellent voltage nonlinearity in voltage/current characteristics and a large surge withstand capability.

Co oxide functions as an acceptor (electron scavenger), and acts as a substance maintaining varistor characteristics. The content of Co oxide with respect to 100 mol of zinc oxide is 0.30 to 10 mol, preferably 0.5 to 7.0 mol, more preferably 0.5 to 5.0 mol in terms of Co.

When the content of Co oxide is too small, as the leakage current increases, ESD withstand capability tends to decrease. Further, when the content of Co oxide is too large, ESD withstand capability particularly tends to decrease due to the insufficient sintering. In both cases, it is likely that good varistor characteristics cannot be achieved.

R oxide acts as a substance increasing a diffusion rate of oxygen diffusing toward a crystal grain boundary. Adding the R oxide enables a sufficient sintering of a sintered body.

For the R element composing R oxide, it is preferable that it is at least one selected from Y, La, Ce, Pr, Nd, Sm, Eu, Gd, Tb, Dy, Ho, Er, Tm, Yb and Lu other than Pm, and it is more preferable that it at least includes Pr. The content of R oxide with respect to 100 mol of zinc oxide is 0.10 to 10 mol, preferably 0.10 to 7.0 mol, more preferably 0.20 to 5.0 mol in terms of R.

By determining the content of R oxide within the above range, it enables to maintain the composition in a condition of semiconductor and also enables to increase the diffusion rate of oxygen diffusing toward the crystal grain boundary.

When the content of R oxide is too small, ESD withstand capability particularly tends to decrease due to the insufficient sintering. Further, when the content of R oxide is too large, R is deposited on the surface and that tends to results in deterioration of reliability. In both cases, it is likely that good varistor characteristics cannot be achieved.

Cr oxide functions as an acceptor (electron scavenger), and acts as a substance maintaining varistor characteristics. The content of Cr oxide with respect to 100 mol of zinc oxide is 0.10 to 5 mol, preferably 0.10 to 3.0 mol, and more preferably 0.20 to 2.0 mol in terms of Cr.

When the content of Cr oxide is too large or too small, ESD withstand capability particularly tends to decrease due to the insufficient sintering.

Oxides of Ca and Sr function as acceptors (electron scavenger), and act as substances maintaining varistor characteristics. In particular, Sr oxide is preferable. The content of oxide of at least one element selected from Ca and Sr with respect to 100 mol of zinc oxide is 0.10 to 5 mol, preferably 0.10 to 3.0 mol, and more preferably 0.10 to 2.0 mol respectively in terms of Ca or Sr.

When the contents of oxides of Ca and Sr are too small, ESD withstand capability particularly tends to decrease. Further, when the contents of oxides of Ca and Sr are too large, grain size fluctuation gets larger and that tends to result in generation of an adverse impact on leakage current and ESD withstand capability. In both cases, it is likely that good varistor characteristics cannot be achieved.

Oxides of Al, Ga and In function as a donor (electron transfer agent), and act as substances maintaining varistor characteristics. In particular, Ga oxide is preferable. The content of oxide of at least one element selected from Al, Ga and In with respect to 100 mol of zinc oxide is 0.0005 to 5 mol, preferably 0.0005 to 3.0 mol, and more preferably 0.001 to 2.0 mol respectively in terms of Al, Ga or In.

When the content of oxides of Al, Ga and In are too small, ESD withstand capability tends to decrease due to the insufficient donor. Further, when the content of oxides of Al, Ga and In are too large, leakage current tends to increase due to the surplus donor. In both cases, it is likely that good varistor characteristics cannot be achieved.

Barium titanate ($BaTiO_3$) has an effect of inhibiting grain growth of crystal grain. The content of barium titanate with respect to 100 mol of zinc oxide is 0.10 to 5 mol, preferably 0.10 to 4.0 mol, and more preferably 0.50 to 4.0 mol in terms of $BaTiO_3$.

When the content of barium titanate is too small, it leads an abnormal grain growth of crystal grain and that results in fluctuation of crystal grain size. With this, as the leakage current increases, it is likely that good varistor characteristics cannot be achieved since ESD withstand capability decreases. When the content of barium titanate is too large, ESD withstand capability particularly tends to decrease due to the insufficient sintering.

Further, the molar ratio of Ba/Ti of barium titanate is not limited to equimolar. For example, the ratio appropriately adjusted in the range of 0.95 to 1.05 can be applied.

Further, in the present specification, the varistor voltage indicates a voltage when a current of 1 mA flows. Furthermore, for varistor characteristics, it indicates various sorts of characteristics such as varistor voltage, leakage current, and ESD withstandability.

Various conditions such as a thickness and the number of laminations of the interlayer voltage nonlinear resistor layer 8 may be appropriately determined according to purposes and uses. In the present embodiment, for example, the thickness of the interlayer voltage nonlinear resistor layer 8 is approximately 5 to 100 μm, and the number of laminations is approximately 10 to 50. Further, the thickness of the outer protective layer 8a is approximately 100 to 500 μm.

Method for Producing a Laminated Chip Varistor

Next, the following is the explanation of one example regarding a method for producing a laminated chip varistor 2 according to the present embodiment.

In the present embodiment, a green chip is prepared by a printing method or a sheet method usually using the paste and then sintered. After that, external terminal electrodes are printed and transferred thereon and sintered to produce the laminated chip varistor. The following is the specific explanation regarding a producing method.

First, the paste for voltage nonlinear resistor layer, the paste for internal electrode layer, and the paste for external terminal electrode are respectively prepared. Voltage nonlinear resistor materials (powders having a voltage nonlinear resistor ceramic composition) are prepared to make it as coating materials, in order to prepare the paste for the voltage nonlinear resistor layer.

For the paste for voltage nonlinear resistor layer, it may be organic coatings that voltage nonlinear resistor materials are mixed with organic vehicle, or it also may be water-based coatings.

As for the voltage nonlinear resistor materials, a mixture or composite oxides of the above-mentioned oxides of main component and subcomponents can be used. In addition to the above, a mixture of various compounds, for example appropriately selected from carbonate, oxalate, nitrate, hydroxide, organic metallic compound and the like, which become the above-mentioned oxides and composite oxides after sintering, can be used.

The content of each component in the voltage nonlinear resistor materials should be determined so that the composition after sintering corresponds to the above-mentioned voltage nonlinear resistor ceramic composition. For these base powders, powders having average grain diameter in the range of 0.3 to 2 µm are generally used.

Organic vehicle is made by dissolving binder in organic solvent. The binder used for organic vehicle is not particularly limited, and it should be appropriately selected from usual various binders such as ethyl cellulose and polyvinyl butyral. The organic solvent to be used is not particularly limited as well, and it should be appropriately selected from various organic solvents such as terpineol, butyl carbitol, aceton, and toluene, in accordance with the usage method, such as printing, sheet method and so on.

Further, when the paste for voltage nonlinear resistor layer is made as water-based coatings, it is only necessary to mix water-based vehicle, that water-soluble binder, dispersing agent and the like are dissolved in water, with dielectric materials. The water-soluble binder is not particularly limited, and for example, polyvinyl alcohol, cellulose, water-soluble acrylic resin and the like can be used.

For the paste for internal electrode layer, it is prepared by mixing the above-mentioned organic vehicle and the above-mentioned various conductive materials or various oxides, organic metallic compounds, resinate and the like that serve as the above-mentioned conductive materials after sintering. Further, for the paste for external terminal electrode, it may be prepared in the same way with the paste for internal electrode layer.

The content of organic vehicle in the above each paste is not particularly limited. For example, generally, the content of binder is approximately 1 to 5 wt %, and the content of solvent is approximately 10 to 50 wt %. Further, in each paste, additives selected from various dispersing agent, plasticizing agent, dielectric material, insulating material and the like may be included as necessary. The total amount of these additives is preferably 10 wt % or less.

When applying a printing method, the paste for voltage nonlinear resistor layer is printed on a substrate of PET and the like more than once with a predetermined thickness to form an outer protective layer 8a of a green body.

Next, on the outer protective layer 8a, the paste for internal electrode layer is printed in a predetermined pattern to form an internal electrode layer 4 of the green body. Next, same as above, on the internal electrode layer 4, the paste for voltage nonlinear resistor layer is printed more than once with a predetermined thickness to form an interlayer voltage nonlinear resistor layer 8 of the green body.

Next, on the interlayer voltage nonlinear resistor layer 8, the paste for internal electrode layer is printed in a predetermined pattern to form an internal electrode layer 6 of the green body. The internal electrode layers 4, 6 are printed so that they expose on mutually opposing end surfaces.

Finally, same as above, on the internal electrode layer 6, the paste for voltage nonlinear resistor layer is printed more than once with a predetermined thickness to form the outer protective layers 8a of the green body. After that, the green body is pressure-bonded while being heated and cut in a predetermined shape, and they are peeled off from the substrate to obtain green chips.

Further, when applying a sheet method, green sheets are formed by using the paste for voltage nonlinear resistor layer. After that, the green sheets are laminated with the predetermined numbers to form the outer protective layers 8a as shown in FIGURE.

Next, on the outer protective layers 8a, the paste for internal electrode layer is printed in a predetermined pattern to form the internal electrode layer 4 of a green body. In the same way, on the other outer protective layers 8a, the internal electrode layer 6 of the green body is formed.

These layers are sandwiched between the interlayer voltage nonlinear resistor layers 8 formed by laminating green sheets with the predetermined numbers and further overlapped so that the internal electrode layers 4, 6 exposes on mutually opposing end surfaces. After that, the green body is pressure-bonded while being heated and cut in a predetermined shape to obtain green chips.

Next, debinding treatment and firing is performed on these green chips to form a sintered body (element body 10).

The debinding treatment for the green chips should be performed under normal conditions. For example, in the air atmosphere, the temperature rising rate is approximately 5 to 300° C./hour, the holding temperature is approximately 180 to 400° C., and the temperature holding time is approximately 0.5 to 24 hours.

Firing of green chips should be performed under normal conditions. For example, in the air atmosphere, the temperature rising rate is approximately 50 to 500° C./hour, the holding temperature is appropriately 1000 to 1400° C., the temperature holding time is approximately 0.5 to 8 hours, and the cooling rate is 50 to 500° C./hour. If the holding temperature is too low, densification tends to be insufficient. Further, if the holding temperature is too high, the electrode discontinuity tends to be caused due to unusual sintering of the internal electrode.

The thus obtained sintered body (element body 10) is for example processed by end surface polishing, such as barrel polishing or sand blasting, and the paste for external terminal electrode is applied thereto and then fired to form the external terminal electrodes 12, 14. For the firing conditions for the paste for external terminal electrodes, for example, it is preferably performed at 600 to 900° C. in the air atmosphere for 10 minutes to one hour.

The thus produced laminated chip varistor 2 of the present embodiment is, for example, connected to a high speed transmission circuit, and is used for protecting such circuit and the like, by absorbing or removing external surge (abnormal voltage), such as static electricity, and noises.

As above, embodiments of the present invention were explained. However, the present invention is not limited to these embodiments, and may be embodied in various forms without departing from the scope of the present invention.

For example, in embodiments mentioned above, a laminated chip varistor is exemplified as an electronic component according to the present invention. However, as the electronic component according to the present invention, it is not limited to the laminated chip varistor, and anything is fine as long as those have a voltage nonlinear resistor layer composed of voltage nonlinear resistor ceramic composition having the above composition.

Further, as shown in FIGURE, the electronic component according to the present invention is not limited to a laminated chip varistor having only a pair of internal electrode layers. In FIGURE, it shows only a pair of internal electrode layers.

However, plural internal electrode pairs may be laminated, or a laminated chip varistor wherein a plurality of internal electrodes are laminated can be fine.

The following is the explanation of the present invention based on further detailed examples. Note that the present invention is not limited to these examples.

EXAMPLE 1

First, materials of main component (ZnO) and materials of subcomponent were prepared. As for materials of subcomponent, oxides, carbonates, carbonate hydrates and the like were used. For $BaTiO_3$, compounds synthesized beforehand were used.

Next, the above materials were combined so that the composition after firing corresponds to the amount shown in Table 1 with respect to 100 mol of zinc oxide, and organic binder, organic solvent, and plasticizing agent were added thereto and then wet-blended for appropriately 20 hours by a ball mill in order to form slurry.

By using this slurry, a green sheet having a thickness of 11 μm was formed on a PET film by a doctor blade method. On the coated green sheet, a screen printing was performed using palladium paste so that the shape becomes a desired form and then dried in order to form an internal electrode 4 shown in FIGURE. Next, an internal electrode 6 shown in FIGURE was formed in the same way.

Further, the outer protective layer 8a which is the outermost layer was formed by overlapping plural number of green sheets having the same composition.

Then, after these green sheets were stacked, heated and pressure-bonded, it was cut so that the shape becomes a predetermined chip form to obtain green chips.

After the debinding treatment was performed on the green chips at 350° C. for two hours, firing was performed at 1190° C. for two hours in the atmosphere, and thereby a sintered body serving as a laminated chip varistor was obtained.

Next, Ag-based electrode paste was applied to both ends of the obtained sintered body, and firing was performed thereon at 800° C. to form terminal electrodes 12, 14. In this way, it enables to obtain a laminated chip varistor having a structure shown in cross section of FIGURE. The size of the obtained varistor sample was 0.6 mm×0.3 mm×0.3 mm, the thickness of the voltage nonlinear resistor layer was 7 μm, and the number of the voltage nonlinear resistor layer sandwiched by internal electrode layers was three. Further, the overlapping area of the internal electrode layers was 0.045 $mm^2$.

By using the obtained varistor samples, grain size, varistor voltage, leakage current (Id) and ESD withstandability were measured.

Grain Size (Gs)

For the measurement of the average grain size, the varistor sample was cut so that a cross section of the voltage nonlinear resistor layer appears, and the cross section was observed by a scanning electron microscope (SEM) to take a SEM photo. An image treatment was performed on this SEM photo by a software to determine the boundary of dielectric particles and thereby the area of each dielectric particle was calculated. Then, the grain size was calculated by converting the calculated area of the dielectric particle to a circle equivalent diameter. The obtained average value of grain size was determined as the average grain size. Further, as for the calculation of grain size, twenty dielectric particles were subject to it. In the present examples, it was determined that the grain size was preferably 2.0 μm or less. Tables 1 to 4 show the results.

Varistor Voltage

The varistor sample was connected to a DC constant voltage power supply to measure the voltage applied between both electrodes of the varistor sample by a voltage meter. Further, along with that, the current flowing in the varistor sample was measured by an ammeter to evaluate the varistor voltage ($V_{1mA}$). Specifically, when the current flowing in the varistor sample was 1 mA, the voltage applied between electrodes of the varistor sample was measured by a voltage meter and the value obtained therefrom was determined as the varistor voltage. The unit for this was expressed by V. Tables 1 to 4 show the results.

Leakage Current (Id)

The leakage current was determined as the current (Id) when the applied voltage is 3V. Specifically, this leakage current is the current flowing in the voltage nonlinear resistor element when the applied voltage is a voltage in which a semiconductor element is generally used. The smaller the current is, the more preferable it is. In the present examples, it was determined that the current was preferably less than 5000 nA. Tables 1 to 4 show the results.

ESD Withstand Capability

ESD withstand capability is a standard of capability for absorbing the amount of static electricity for the varistor. For example, it can be measured by an electrostatic discharge immunity test specified in IEC61000-4-2 of IEC (International Electrotechnical Commission). In the present examples, it was determined that the ESD withstand capability was preferably 8 kV or more. Tables 1 to 4 show the results.

TABLE 1

| Sample No. | Subcomponet (with respect to 100 mol of zinc oxide) | | | | | | Grain Size | Varistor Voltage | | ESD Withstand Capability |
| --- | --- | --- | --- | --- | --- | --- | --- | --- | --- | --- |
| | Co mol | R: Pr mol | Cr mol | Sr mol | Ga mol | $BaTiO_3$ mol | Gs μm | $V_{1mA}$ V | Id@3 V nA | kV |
| **1 | 0.05 | 2.50 | 0.50 | 0.25 | 0.20 | 1.00 | 1.80 | — | >measure limit | — |
| **2 | 0.10 | 2.50 | 0.50 | 0.25 | 0.20 | 1.00 | 1.81 | 5.9 | >measure limit | 0 |
| 3 | 0.30 | 2.50 | 0.50 | 0.25 | 0.20 | 1.00 | 1.80 | 6.2 | 4987 | 8 |
| 4 | 0.50 | 2.50 | 0.50 | 0.25 | 0.20 | 1.00 | 1.72 | 6.4 | 2264 | 15 |
| 5 | 1.00 | 2.50 | 0.50 | 0.25 | 0.20 | 1.00 | 1.69 | 7.2 | 240 | 12 |
| 6 | 2.00 | 2.50 | 0.50 | 0.25 | 0.20 | 1.00 | 1.65 | 7.7 | 65 | 10 |
| 7 | 5.00 | 2.50 | 0.50 | 0.25 | 0.20 | 1.00 | 1.61 | 8.0 | 32 | 9 |
| 8 | 10.00 | 2.50 | 0.50 | 0.25 | 0.20 | 1.00 | 1.65 | 9.1 | 15 | 8 |
| **9 | 20.00 | 2.50 | 0.50 | 0.25 | 0.20 | 1.00 | 1.63 | — | — | 0 |
| **10 | 1.00 | 0.05 | 0.50 | 0.25 | 0.20 | 1.00 | 1.86 | — | — | 0 |
| 11 | 1.00 | 0.10 | 0.50 | 0.25 | 0.20 | 1.00 | 1.85 | 10.9 | 11 | 8 |
| 12 | 1.00 | 0.30 | 0.50 | 0.25 | 0.20 | 1.00 | 1.82 | 10.2 | 12 | 8 |
| 13 | 1.00 | 0.50 | 0.50 | 0.25 | 0.20 | 1.00 | 1.75 | 9.8 | 52 | 9 |
| 14 | 1.00 | 1.00 | 0.50 | 0.25 | 0.20 | 1.00 | 1.72 | 9.4 | 105 | 10 |

TABLE 1-continued

| Sample No. | Subcomponet (with respect to 100 mol of zinc oxide) | | | | | | Grain Size Gs μm | Varistor Voltage V$_{1 mA}$ V | Id@3 V nA | ESD Withstand Capability kV |
| | Co mol | R: Pr mol | Cr mol | Sr mol | Ga mol | BaTiO$_3$ mol | | | | |
|---|---|---|---|---|---|---|---|---|---|---|
| 5 | 1.00 | 2.00 | 0.50 | 0.25 | 0.20 | 1.00 | 1.69 | 7.2 | 240 | 12 |
| 15 | 1.00 | 5.00 | 0.50 | 0.25 | 0.20 | 1.00 | 1.64 | 6.8 | 732 | 12 |
| 16 | 1.00 | 10.00 | 0.50 | 0.25 | 0.20 | 1.00 | 1.61 | 6.3 | 2501 | 8 |
| **17 | 1.00 | 20.00 | 0.50 | 0.25 | 0.20 | 1.00 | 1.60 | — | — | 0 |
| **18 | 1.00 | 2.50 | 0.01 | 0.25 | 0.20 | 1.00 | 1.58 | 8.5 | 97 | 0 |
| 19 | 1.00 | 2.50 | 0.10 | 0.25 | 0.20 | 1.00 | 1.62 | 7.6 | 102 | 8 |
| 20 | 1.00 | 2.50 | 0.30 | 0.25 | 0.20 | 1.00 | 1.68 | 7.3 | 221 | 9 |
| 5 | 1.00 | 2.50 | 0.50 | 0.25 | 0.20 | 1.00 | 1.69 | 7.2 | 240 | 12 |
| 21 | 1.00 | 2.50 | 1.00 | 0.25 | 0.20 | 1.00 | 1.72 | 7.0 | 374 | 10 |
| 22 | 1.00 | 2.50 | 2.00 | 0.25 | 0.20 | 1.00 | 1.60 | 7.8 | 254 | 9 |
| 23 | 1.00 | 2.50 | 5.00 | 0.25 | 0.20 | 1.00 | 1.52 | 8.3 | 123 | 8 |
| **24 | 1.00 | 2.50 | 10.00 | 0.25 | 0.20 | 1.00 | 1.13 | 12.0 | 21 | 0 |
| **25 | 1.00 | 2.50 | 0.50 | 0.01 | 0.20 | 1.00 | 1.53 | 8.2 | 51 | 4 |
| 26 | 1.00 | 2.50 | 0.50 | 0.10 | 0.20 | 1.00 | 1.61 | 7.7 | 65 | 8 |
| 5 | 1.00 | 2.50 | 0.50 | 0.25 | 0.20 | 1.00 | 1.69 | 7.2 | 240 | 12 |
| 27 | 1.00 | 2.50 | 0.50 | 0.50 | 0.20 | 1.00 | 1.76 | 6.8 | 1221 | 11 |
| 28 | 1.00 | 2.50 | 0.50 | 1.00 | 0.20 | 1.00 | 1.81 | 6.6 | 2450 | 10 |
| 29 | 1.00 | 2.50 | 0.50 | 2.00 | 0.20 | 1.00 | 1.87 | 6.3 | 3652 | 9 |
| 30 | 1.00 | 2.50 | 0.50 | 5.00 | 0.20 | 1.00 | 1.95 | 6.0 | 4877 | 8 |
| **31 | 1.00 | 2.50 | 0.50 | 10.00 | 0.20 | 1.00 | 2.07 | 5.4 | >measure limit | 0 |
| **32 | 1.00 | 2.50 | 0.50 | 0.25 | 0.00 | 1.00 | 1.63 | 10.2 | 21 | 0 |
| 33 | 1.00 | 2.50 | 0.50 | 0.25 | 0.00 | 1.00 | 1.64 | 8.9 | 43 | 8 |
| 34 | 1.00 | 2.50 | 0.50 | 0.25 | 0.00 | 1.00 | 1.62 | 8.5 | 45 | 8 |
| 35 | 1.00 | 2.50 | 0.50 | 0.25 | 0.01 | 1.00 | 1.67 | 7.8 | 56 | 9 |
| 36 | 1.00 | 2.50 | 0.50 | 0.25 | 0.10 | 1.00 | 1.60 | 7.8 | 123 | 11 |
| 5 | 1.00 | 2.50 | 0.50 | 0.25 | 0.20 | 1.00 | 1.69 | 7.2 | 240 | 12 |
| 37 | 1.00 | 2.50 | 0.50 | 0.25 | 0.50 | 1.00 | 1.65 | 6.9 | 255 | 12 |
| 38 | 1.00 | 2.50 | 0.50 | 0.25 | 1.00 | 1.00 | 1.65 | 6.7 | 267 | 12 |
| 39 | 1.00 | 2.50 | 0.50 | 0.25 | 2.00 | 1.00 | 1.66 | 6.4 | 1256 | 8 |
| 40 | 1.00 | 2.50 | 0.50 | 0.25 | 5.00 | 1.00 | 1.62 | 6.0 | 2459 | 8 |
| **41 | 1.00 | 2.50 | 0.50 | 0.25 | 10.00 | 1.00 | 1.66 | 5.0 | >measure limit | 2 |
| **42 | 1.00 | 2.50 | 0.50 | 0.25 | 0.20 | 0.01 | 2.76 | 4.3 | >measure limit | 0 |
| 43 | 1.00 | 2.50 | 0.50 | 0.25 | 0.20 | 0.10 | 1.92 | 6.1 | 1086 | 8 |
| 44 | 1.00 | 2.50 | 0.50 | 0.25 | 0.20 | 0.20 | 1.88 | 6.3 | 502 | 8 |
| 45 | 1.00 | 2.50 | 0.50 | 0.25 | 0.20 | 0.30 | 1.79 | 6.7 | 322 | 8 |
| 46 | 1.00 | 2.50 | 0.50 | 0.25 | 0.20 | 0.50 | 1.76 | 6.8 | 288 | 12 |
| 5 | 1.00 | 2.50 | 0.50 | 0.25 | 0.20 | 1.00 | 1.69 | 7.2 | 240 | 12 |
| 47 | 1.00 | 2.50 | 0.50 | 0.25 | 0.20 | 3.00 | 1.40 | 9.2 | 30 | 8 |
| 48 | 1.00 | 2.50 | 0.50 | 0.25 | 0.20 | 5.00 | 1.31 | 12.0 | 19 | 8 |
| **49 | 1.00 | 2.50 | 0.50 | 0.25 | 0.20 | 10.00 | 1.00 | 18.0 | 12 | 0 |

By reference to Table 1, when the content of subcomponent is out of range of the present invention (sample numbers 1, 2, 9, 10, 17, 18, 24, 25, 31, 32, 41, 42 and 49), it could be confirmed that one or more of crystal grain size, varistor voltage, leakage current and ESD withstand capability tended to be inferior.

With respect to this, when the content of subcomponent was within the range of the present invention (sample numbers 3 to 8, 11 to 16, 19 to 23, 26 to 30, 33 to 40 and 43 to 48),
it could be confirmed that crystal grain size, varistor voltage, leakage current and ESD withstand capability were all excellent.

EXAMPLE 2

Except that the additive amount of subcomponent and the interlayer thickness were changed as shown in Table 2, laminated chip varistor examples (sample numbers 51 to 54) were produced as with example 1. Table 2 shows the result.

TABLE 2

| Sample No. | Subcomponent (with respect to 100 mol of zinc oxide) | | | | | | interlayer μm | Grain Size Gs μm | Varistor Voltage V$_{1 mA}$ V | Id@3 V nA | ESD Withstand Capability kV |
| | Co mol | R: Pr mol | Cr mol | Sr mol | Ga mol | BaTiO$_3$ mol | | | | | |
|---|---|---|---|---|---|---|---|---|---|---|---|
| **51 | 1.00 | 2.50 | 0.50 | 0.25 | 0.20 | — | 10 | 2.76 | 7.2 | 265 | 8 |
| **52 | 1.00 | 2.50 | 0.50 | 0.25 | 0.20 | — | 7 | 2.76 | 4.3 | >measure limit | 0 |
| 53 | 1.00 | 2.50 | 0.50 | 0.25 | 0.20 | 1.00 | 10 | 1.69 | 10.3 | 12 | 15 |
| 5 | 1.00 | 2.50 | 0.50 | 0.25 | 0.20 | 1.00 | 7 | 1.69 | 7.2 | 240 | 12 |
| 54 | 1.00 | 2.50 | 0.50 | 0.25 | 0.20 | 1.00 | 5.5 | 1.59 | 6.6 | 538 | 8 |

By reference to Table 2, the crystal grain size tended to get larger when BaTiO$_3$ was not included as subcomponent (sample numbers 51 and 52). For such samples outside the range of the present invention, the crystal grain size had little impact on characteristics when the interlayer was thick to a certain degree (approximately 10 μm). However, when the interlayer thickness got thinner, which was appropriately 7 μm or thinner, it could be confirmed that varistor voltage, leakage current and ESD withstand capability tended to get worse.

With respect to this, when the predetermined subcomponent was included and that was within the range of the present invention (sample numbers 5, 53 and 54), it could be confirmed that it enabled to inhibit a grain growth of crystal grain. Further, even when the interlayer thickness got thinner, it could be confirmed that varistor voltage, leakage current and ESD withstand capability were all excellent.

EXAMPLE 3

Next, laminated chip varistor sample was produced, as a comparative example (sample number 55), with respect to 100 mol of ZnO, 1.00 mol of Co oxide in terms of Co, 2.50 mol of Bi oxide in terms of Bi, 0.50 mol of Cr oxide in terms of Cr, 0.20 mol of Ga oxide in teams of Ga, and 1.00 mol of barium titanate in terms of BaTiO$_3$ were included, the interlayer was determined as 10 μm, and others were prepared as with example 1.

Further, sample 55 is different from sample 53 in that Bi was added instead of Pr. Table 3 shows the result.

TABLE 3

| Sample No. | Subcomponent R: Pr | Subcomponent Bi | Subcomponent BaTiO$_3$ | Interlayer μm | Grain Size Gs μm | Varistor Voltage $V_{1mA}$ V | Id@3 V nA | ESD Withstand Capability kV |
|---|---|---|---|---|---|---|---|---|
| 53 | ○ | — | ○ | 10 | 1.69 | 10.3 | 12 | 15 |
| **55 | — | ○ | ○ | 10 | 1.83 | 7.5 | 60432 | 0 |

By reference to Table 3, when the predetermined rare earth elements (for example, R is Pr) were not included as subcomponent and Bi oxide was included (sample number 55), it could be confirmed that leakage current and ESD withstand capability tended to get worse.

With respect to this, in samples of the present invention (sample number 53) that the predetermined rare earth elements (for example, R is Pr) were included as subcomponent and Bi was not substantially included, it could be confirmed that crystal grain size, varistor voltage, leakage current and ESD withstand capability were all excellent.

EXAMPLE 4

Except that the subcomponents were changed as shown in Table 4, laminated chip varistor samples (sample numbers 61 to 80) were produced as with Example 1. Table 4 shows the result.

TABLE 4

| Sample No. | Subcomponent (with respect to 100 mole of zinc oxide) | | | | | | Grain Size | Varistor Voltage | | ESD Withstand |
|---|---|---|---|---|---|---|---|---|---|---|
| | Co mol | R: Pr mol | Cr mol | Ca/Sr mol | Al/Ga/In mol | BaTiO$_3$ mol | Gs μm | $V_{1mA}$ V | Id@3 V nA | Capability kV |
| 61 | 1.00 | Pr: 2.00 | 0.50 | Sr: 0.25 | Ga: 0.20 | 1.00 | 1.65 | 7.0 | 238 | 12 |
| 62 | 1.00 | Y: 2.00 | 0.50 | Sr: 0.25 | Ga: 0.20 | 1.00 | 1.74 | 7.5 | 600 | 12 |
| 63 | 1.00 | Nd: 2.00 | 0.50 | Sr: 0.25 | Ga: 0.20 | 1.00 | 1.79 | 7.5 | 265 | 12 |
| 64 | 1.00 | Sm: 2.00 | 0.50 | Sr: 0.25 | Ga: 0.20 | 1.00 | 1.73 | 7.3 | 260 | 12 |
| 65 | 1.00 | Eu: 2.00 | 0.50 | Sr: 0.25 | Ga: 0.20 | 1.00 | 1.75 | 7.3 | 289 | 12 |
| 66 | 1.00 | Gd: 2.00 | 0.50 | Sr: 0.25 | Ga: 0.20 | 1.00 | 1.74 | 7.4 | 275 | 12 |
| 67 | 1.00 | Tb: 2.00 | 0.50 | Sr: 0.25 | Ga: 0.20 | 1.00 | 1.73 | 7.2 | 284 | 12 |
| 68 | 1.00 | Dy: 2.00 | 0.50 | Sr: 0.25 | Ga: 0.20 | 1.00 | 1.75 | 7.2 | 260 | 12 |
| 69 | 1.00 | Ho: 2.00 | 0.50 | Sr: 0.25 | Ga: 0.20 | 1.00 | 1.73 | 7.7 | 252 | 12 |
| 70 | 1.00 | Er: 2.00 | 0.50 | Sr: 0.25 | Ga: 0.20 | 1.00 | 1.78 | 7.2 | 259 | 12 |
| 71 | 1.00 | Tm: 2.00 | 0.50 | Sr: 0.25 | Ga: 0.20 | 1.00 | 1.77 | 7.5 | 280 | 12 |
| 72 | 1.00 | Lu: 2.00 | 0.50 | Sr: 0.25 | Ga: 0.20 | 1.00 | 1.78 | 7.2 | 258 | 12 |
| 73 | 1.00 | Ce: 2.00 | 0.50 | Sr: 0.25 | Ga: 0.20 | 1.00 | 1.70 | 7.2 | 244 | 12 |
| 74 | 1.00 | Yb: 2.00 | 0.50 | Sr: 0.25 | Ga: 0.20 | 1.00 | 1.70 | 7.5 | 241 | 12 |
| 75 | 1.00 | La: 2.00 | 0.50 | Sr: 0.25 | Ga: 0.20 | 1.00 | 1.73 | 7.7 | 248 | 12 |
| 76 | 1.00 | Pr: 1.00 Y: 1.00 | 0.50 | Sr: 0.25 | Ga: 0.20 | 1.00 | 1.68 | 7.0 | 246 | 12 |
| 77 | 1.00 | Pr: 2.00 | 0.50 | Ca: 0.25 | Ga: 0.20 | 1.00 | 1.69 | 7.0 | 243 | 12 |

TABLE 4-continued

| | Subcomponent (with respect to 100 mole of zinc oxide) | | | | | Grain Size | Varistor Voltage | | ESD Withstand |
|---|---|---|---|---|---|---|---|---|---|
| Sample No. | Co mol | R: Pr mol | Cr mol | Ca/Sr mol | Al/Ga/In mol | BaTiO$_3$ mol | Gs μm | V$_{1\,mA}$ V | Id@3 V nA | Capability kV |
| 78 | 1.00 | Pr: 2.00 | 0.50 | Sr: 0.15 Ca: 0.10 | Ga: 0.20 | 1.00 | 1.74 | 7.3 | 243 | 12 |
| 35 | 1.00 | Pr: 2.50 | 0.50 | Sr: 0.25 | Ga: 0.01 | 1.00 | 1.67 | 7.8 | 56 | 9 |
| 79 | 1.00 | Pr: 2.50 | 0.50 | Sr: 0.25 | Al: 0.01 | 1.00 | 1.64 | 7.9 | 62 | 8 |
| 80 | 1.00 | Pr: 2.50 | 0.50 | Sr: 0.25 | In: 0.01 | 1.00 | 1.59 | 7.6 | 72 | 10 |

By reference to Table 4, as for subcomponents, even when elements selected as R, the combination of Ca or Sr, or any of Al, Ga and In were different, as long as the predetermined subcomponents were included and that was within the range of the present invention (sample numbers 35, 61 to 80), it could be confirmed that varistor voltage, leakage current and ESD withstand capability were all excellent even when the interlayer thickness got thinner without a crystal grain growth.

DESCRIPTION OF THE NUMERALS

2—laminated chip varistor
4, 6—internal electrode layer
8—interlayer voltage nonlinear resistor layer
8a—outer protective layer
10—element body
12, 14—external terminal electrodes

The invention claimed is:

1. A voltage nonlinear resistor ceramic composition comprising,
   zinc oxide,
   with respect to 100 mol of said zinc oxide, 0.30 to 10 mol of Co oxide in terms of Co,
   0.10 to 10 mol of R oxide (note that R is at least one selected from a group consisting of Y, La, Ce, Pr, Nd, Sm, Eu, Gd, Tb, Dy, Ho, Er, Tm, Yb and Lu) in terms of R,
   0.10 to 5 mol of Cr oxide in terms of Cr,
   0.10 to 5 mol of oxide of at least one selected from Ca and Sr respectively in terms of Ca or Sr,
   0.0005 to 5 mol of oxide of at least one selected from Al, Ga and In, respectively in terms of Al, Ga or In, and
   0.10 to 5 mol of barium titanate in terms of BaTiO$_3$,
   wherein the voltage nonlinear resistor ceramic composition does not include Bi.

2. An electronic component having a voltage nonlinear resistor layer composed of the voltage nonlinear resistor ceramic composition as set forth in claim 1.

* * * * *